Jan. 29, 1963    E. V. SELLARS    3,075,402
ACCELERATOR HOLD-DOWN DEVICE FOR A MOTOR VEHICLE
Filed Nov. 16, 1959
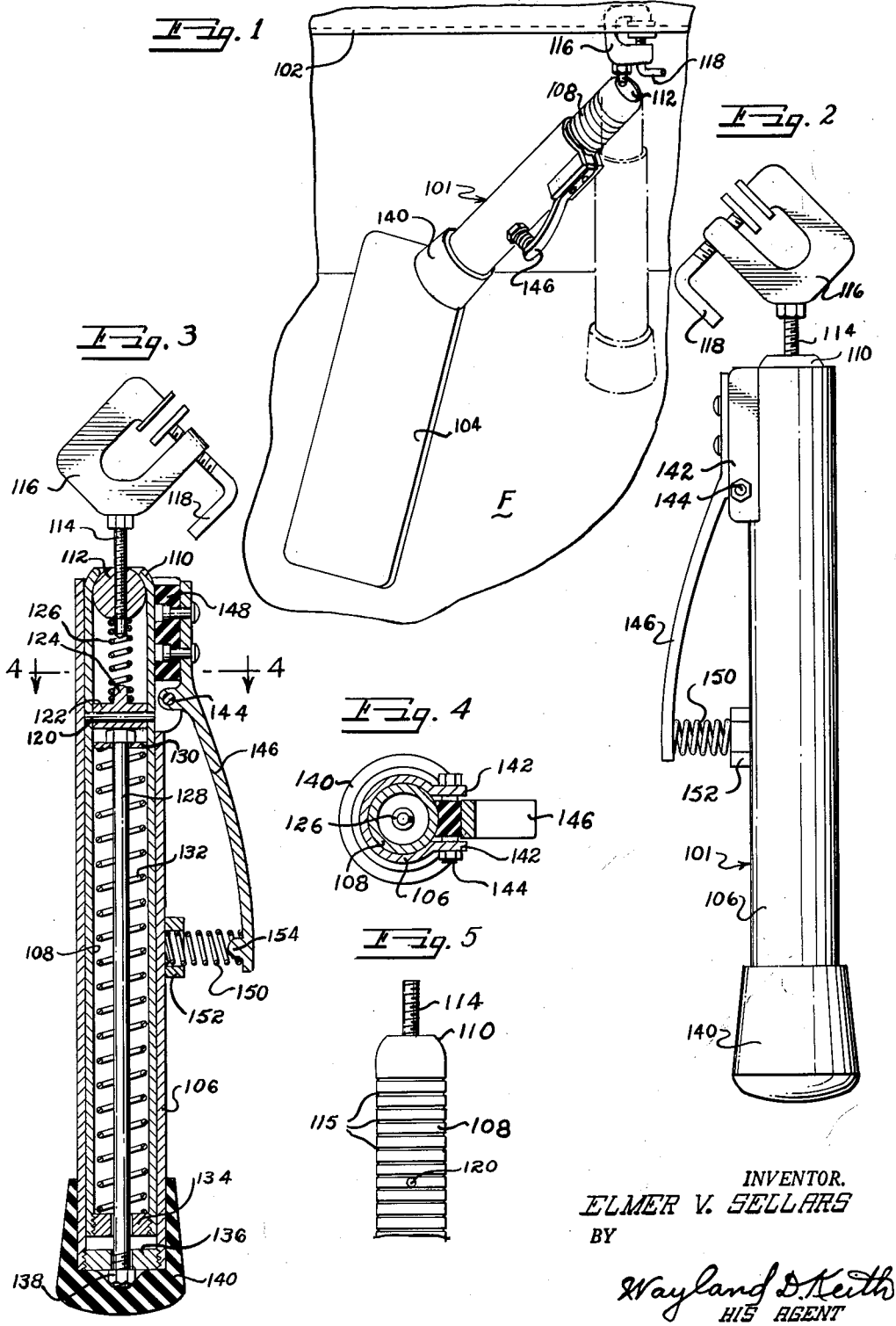
INVENTOR.
ELMER V. SELLARS
BY
Wayland D. Keith
HIS AGENT

United States Patent Office 3,075,402
Patented Jan. 29, 1963

3,075,402
ACCELERATOR HOLD-DOWN DEVICE FOR A MOTOR VEHICLE
Elmer V. Sellars, 329 W. Mississippi, Floydada, Tex.
Filed Nov. 16, 1959, Ser. No. 853,042
2 Claims. (Cl. 74—532)

This invention relates to improvements in a device for holding vehicle accelerators in a set position, and more particularly to an accelerator holding device which may be quickly and accurately set to hold an accelerator in any fixed position, but which may be quickly released, when desired, and returned to the identical set position, without the necessity of readjustment thereof.

Various accelerator depressing devices have been proposed heretofore, but these, for the most part, have been built integral with the car, and did not lend themselves to ready release and to quick adjustment to the exact degree of throttle opening as previously determined.

Throttle depressing and holding devices heretofore have been, for the most part, quite complex and required a skilled mechanic for the installation thereof, or they were made integral with the car, and the actuation thereof was dependent on the actuation of some other mechanism, such as a hand throttle, to hold the accelerator depressed and the throttle in fixed position.

The present device, as shown herein, enables an accelerator to be accurately depressed to open the throttle an exact amount to give the engine the desired r.p.m. necessary to make certain adjustments, when used in a shop, or, to give a uniform driving speed while the car is being used on the road, thereby relieving driver fatigue and also giving greater economy in the operation of the car by eliminating the "pumping" of the accelerator, which causes injection of addition fuel into the engine manifold.

An object of this invention is to provide a hold-down device for an accelerator of a vehicle, which may be adjusted minutely, to feed fuel to an internal combustion engine in an exact, gauged amount, which hold-down device may be readily released, so as to bring the engine speed back to normal idling, and which may be instantaneously reset to the exact throttle position, for testing the engine, at exactly the same r.p.m., or if on the road, to return to the setting which will give the exact same miles per hour, without further adjustments.

Another object of this invention is to provide an accelerator hold-down device which may be readily attached to or detached from a car, without the use of tools.

A still further object of the invention is to provide an accelerator hold-down device for use in a shop or the like, which may be readily attached to and detached from a motor vehicle, and which may be used on various makes and models of motor vehicles, without the necessity of using additional parts.

Yet another object of the invention is to provide an accelerator hold-down device, which is simple in construction, which is easy to manufacture, low in cost, and easy to install on practically any make or model car.

With these objects in mind and others which will become manifest as the description proceeds, reference is to be had to the accompanying drawings in which like reference characters designiate like parts in the several views thereof in which:

FIG. 1 is an elevational view showing a modified form of the invention installed on the lower edge of the dash of a vehicle, and showing the device, in full outline, in position to depress an accelerator, and the device in dot-dash outline showing the accelerator in released position;

FIG. 2 is a side elevational view of the device shown apart from the vehicle;

FIG. 3 is a longitudinal, sectional view through the modified form of the device with certain parts being shown in elevation;

FIG. 4 is a sectional view taken on the line 4—4 of FIG. 3, looking in the direction indicated by the arrows; and FIG. 5 is a fragmentary elevational view of the upper portion of the inner plunger of the modified form of the invention.

The device utilizes a hold-down member 101 which is attachably connected to the cowl 102 of a car, and is so constructed that it may be left on the car while driving, or it may be removed and attached in another car in the matter of minutes, as desired.

FIG. 1 shows the device attached to the cowl of a car, with the full line position showing the device in position to engage and hold down the accelerator 104 of the car, and the dot-dash outline indicating the released or normal position of the accelerator hold-down device.

The accelerator hold-down device, designated generally by the numeral 101, has an outer tubular casing 106 which is telescoped over an inner tubular casing 108, as will best be seen in FIG. 3. The inner tubular casing 108 is swaged inward, as indicated at 110, at the upper end thereof to complementally receive a ball 112 or a segment thereof for universal movement of the tubular member 108 about said ball. A screw threaded member or pin 114 is secured to the ball 112 and extends outward through the open end of the inner tubular member 108. The outer tubular member 106 has a centrally apertured abutment 136 in an end thereof. The inner tubular member 108 has a centrally apertured abutment 134 secured in an end thereof, which centrally apertured abutments are adjacent. A clamp member 116 is secured to threaded member 114 and has a screw threaded member 118 therein to bindingly engage with the cowl 102 of the car. The inner tubular member 108 has a pin 120 passing transversely therethrough and through a partition member 122 so as to form an abutment intermediate the ends of tubular member 108. A central projection 124 extends upward from partition 122 so as to receive the lower end of spring 126 therearound. The upper end of spring 126 abuts with ball 112 and surrounds the lower end of screw threaded member 114 so as to hold the ball seated within the swaged socket 110 of the inner tubular member 108. A rod or bolt 128 is fitted axially within tubular member 108 and has a washer 130 adjacent the head thereof. A compression spring 132 surrounds bolt 128 which bolt extends downward and outward through an apertured end 134 of inner tubular member 108 and out through an apertured end 136 of outer tubular member 106, with a nut 138 screw threaded onto the lower end of bolt 128, to form an abutment therefor. The end members 134 and 136 may be secured in the respective tubes 108 and 106 by threads or the like. A rubber foot member 140 is fitted over the lower end of said outer tubular member 106 and in abutment with the end member 136 of tubular member 106. The outer tubular member 106 is notched near the upper end thereof, as will best be seen in FIGS. 3 and 4, with a portion of the tubular member 106 turned outward to form ears 142, which ears are apertured to receive a bolt or pin 144 therethrough to pivotally mount lever 146. The lever 146 has a rubber friction member 148 secured thereto on one end thereof, which rubber friction member is adapted to be in bearing relation with the outer face of inner tubular member 108 when in one position. A spring 150 is interposed between the lever 146 and the outer face of outer tubular member 106, so as to urge the rubber friction member, positioned on the outer end of lever 146, into frictional engagement with the outer face of the inner tubular member 108.

An apertured member 152 is secured to the outer face of outer tubular member 106 and is adapted to receive an end of spring 150 therein to prevent lateral movement of said spring with respect to outer tubular member 106. A projection 154 extends inward from lever 146, near the outer end thereof to receive the opposite end of spring 150.

The outer face of inner tubular member 108 has circumferential grooves 115 formed therearound at spaced intervals, for at least a portion of the length thereof, to form a coacting frictional surface with rubber friction member 148.

*Operation*

With the clamp member 116 attached to the lower edge of the cowl of the car, at a position slightly to one side of accelerator 104, and in a position to be out of the normal line of movement of the accelerator, the device is ready to be operated.

When it is desired to hold the accelerator 104 in a fixed relation with respect to the floorboard F of an automobile, the accelerator hold-down member 101 is swung from the position as indicated in dot-dash outline in FIG. 1, to that shown in full outline therein, whereupon, the lever 146 may be grasped to disengage the rubber friction member 148 from the outer face of inner tubular member 108, whereupon, the outer tubular member 106 is moved downward, and with the nut 138 in engagement with the lower end member 136 of the outer tubular member 106, the spring 132, between washer 130 and the end 134 of the inner tubular member 108, will be compressed, and the rubber foot member 140 will be in engagement with a corner or end of accelerator 104 to maintain the accelerator in a fixed, depressed relation to the floorboard F, as has previously been determined, either by the speedometer, if the car is operating on the highway, or by a tachometer, or by listening to the running of the engine at idle speed. Then, by releasing pressure on handle 146, the rubber friction member 148 will engage the outer surface of inner tubular member 108 so as to hold the inner tubular member in a fixed relation with respect to said outer tubular member.

The driving or idling will continue at the predetermined setting so long as desired. However, by lightly touching the accelerator 104, the accelerator hold-down member 101 will be swung, by gravity or by the influence of spring 126, from the position as indicated in full outline in FIG. 1, to that indicated in dot-dash outline therein, which will permit the accelerator 104 to return to the normal position it occupied prior to the engagement of the accelerator hold-down device.

The device is shown to have a spring 126 positioned to move the accelerator hold-down device from the position as shown in full outline in FIG. 1 to that shown in dot-dash outline therein. However, the spring 126 may be dispensed with, if desired, in which event the accelerator hold-down device will swing, by gravity from the position shown in full outline to that shown in dot-dash-outline.

When it is desired to release the setting or the hold-down device or to set it to a different position, the lever 146 is depressed, which will permit the spring 132 to urge the washer 130 upward, which in turn, will draw bolt 128 upward, as well as outer tubular member 106. This will shorten the extended length of the hold-down device 101 to the desired point, which accelerator hold-down device may be adjusted at the shorter length to hold down the accelerator, or it may be swung to one side in this telescoped position, to be out of the way, for the accelerator to be operated without the hold-down device.

Having thus clearly shown and described the invention, what is claimed as new and desired to be secured by Letters Patent is:

1. An accelerator hold-down device which is mounted on the cowl of a car and extends downward to the accelerator thereof when in one position, which device comprises an outer tubular member and an inner tubular member, which tubular members are telescoped together in free sliding relation so that the inner tubular member is substantially received within said outer tubular member, said outer tubular member having a centrally apertured abutment secured to the end thereof remote from the cowl of the car, said inner tubular member having a centrally apertured abutment secured in an end thereof adjacent the abutment in said outer tubular member, a rod extending through said apertured abutments and being in free sliding relation with the abutment on said inner tubular member, which rod extends into said inner tubular member to a spaced distance from the end opposite that having the abutment therein, said rod having an abutment formed on an end thereof, which abutment is in engagement with said centrally apertured abutment on said outer tubular member to maintain said rod against relative movement with respect to said outer tubular member, a washer secured to the outer end of said rod in position to be opposite said abutment on said inner tubular member and forming an abutment for a spring, a compression spring surrounding said rod intermediate said abutment on said inner tubular member and said washer on said rod, friction holding means mounted on said outer tubular member, which means is engageable with said inner tubular member to hold said inner tubular member in adjusted relation with respect to said outer tubular member, clamp means movably mounted on said inner tubular member at the end thereof opposite said centrally apertured abutment, said clamp means adapted to be secured to the cowl of a car to enable said hold-down device to hold the accelerator of the car down when the device is in one position, and a spring interconnected between said clamp means and said inner tubular member to automatically move said hold-down device laterally upon downward movement of the accelerator, which hold-down device holds the accelerator depressed the same amount as originally depressed upon manually moving said hold-down device laterally into engagement with the accelerator.

2. An accelerator hold-down device which is mounted on the cowl of a car and extends downward to the accelerator thereof when in one position, which device comprises an outer tubular member and an inner tubular member telescoped together in free sliding relation so the inner tubular member is substantially received within the outer tubular member, the outer tubular member having a centrally apertured abutment secured in the end thereof remote from the cowl of the car, said inner tubular member having a centrally apertured abutment secured in the end thereof which is adjacent said abutment in said outer tubular member, a rod extending upward through said apertured abutments in said tubular members and into said inner tubular member, said rod having an abutment formed on each end thereof, one of which abutments on said rod engages the abutment in the outer tubular member, a spring telescoped over said rod, one end of which spring is in engagement with the abutment on the other end of said rod, the other end of said spring being in engagement with said centrally apertured abutment in said inner tubular member so as to normally draw said inner tubular member into telescoped relation with said outer tubular member, a transverse pin forming an abutment, secured in said inner tubular member intermediate the ends thereof, said inner tubular member having a spherical member mounted in the end thereof opposite said apertured abutment for movement of said spherical member about the center thereof and for limited longitudinal movement within said inner tubular member, the end of said inner tubular member in which said spherical member is mounted being swaged inward over a portion of said spherical member to retain said spherical member within said inner tubular member, a further spring interposed between said transverse abutment in said inner tubular member and said spherical member to urge said spherical member into seating relation within the swaged portion of said inner tubular member, said spherical member having a screwthreaded axial member secured therethrough, a portion of which screwthreaded axial member extends outwardly above said spherical member, a portion of said screwthreaded axial member extending into said inner tubular member to engage said further spring means to move the axis of said inner tubular member from a non-axially aligned position with respect to said screwthreaded axial member, when said device is in engagement with the accelerator, to a normally aligned position upon dis-engagement thereof from the accelerator, a clamp member secured to the outwardly extending end of said screwthreaded axial member, said clamp member being adapted to bindingly engage with the cowl of a car, a lever pivotally mounted on the upper portion of said outer tubular member, resilient friction material mounted on the end of said lever nearest said clamp, spring means mounted between the opposite end of said lever and said outer tubular member to urge said friction material into engagement with said inner tubular member to maintain said tubular members in adjusted relation against the compression of said first mentioned spring, said tubular members being releasable for relative movement therebetween upon movement of said lever from engaged position to disengaged position, and a resilient foot member mounted on the end of said outer tubular member which is adapted to engage said accelerator.

References Cited in the file of this patent

UNITED STATES PATENTS

| | | |
|---|---|---|
| 1,783,902 | Brost | Dec. 2, 1930 |
| 2,138,911 | Evans et al. | Dec. 6, 1938 |
| 2,590,320 | Houser | Mar. 25, 1952 |
| 2,671,355 | Hawkins | Mar. 9, 1954 |
| 2,729,115 | Reynolds et al. | Jan. 3, 1956 |
| 2,766,960 | Weber | Oct. 16, 1956 |
| 2,820,626 | Hedeen | Jan. 21, 1958 |
| 2,866,356 | Elam | Dec. 30, 1958 |
| 2,917,142 | Thorner | Dec. 15, 1959 |
| 2,932,504 | Avery | Apr. 12, 1960 |

FOREIGN PATENTS

| | | |
|---|---|---|
| 790,088 | France | Sept. 2, 1935 |
| 923,116 | Germany | Feb. 3, 1955 |